US005086681A

United States Patent [19]

Ruetschle et al.

[11] Patent Number: 5,086,681

[45] Date of Patent: Feb. 11, 1992

[54] BOOK FEEDING AND TRIMMING APPARATUS

[75] Inventors: Rudolph H. Ruetschle, Avon Lake; Philip A. Yakovac, Euclid, both of Ohio

[73] Assignee: K. S. Macey Machine Company, Inc., Cleveland, Ohio

[21] Appl. No.: 458,762

[22] Filed: Dec. 19, 1989

[51] Int. Cl.$^5$ .......... B26D 5/20; B65G 47/31

[52] U.S. Cl. .......... 83/277; 83/253; 83/422; 83/934; 198/461

[58] Field of Search .......... 83/934, 422, 435.2, 83/213, 253, 277; 198/461; 493/319, 179, 182

[56] References Cited

U.S. PATENT DOCUMENTS

| | | | |
|---|---|---|---|
| 3,146,650 | 9/1964 | Sarring | 83/934 |
| 3,382,965 | 5/1968 | Pierce | 198/461 |
| 3,570,344 | 3/1971 | Bryson | 83/934 |
| 3,901,375 | 8/1975 | Rague | 198/461 |
| 4,529,082 | 7/1985 | Mally | 198/461 |
| 4,546,871 | 10/1985 | Duke | 198/461 |
| 4,838,408 | 6/1989 | Brawn | 198/461 |

*Primary Examiner*—Daniel C. Crane
*Attorney, Agent, or Firm*—Fay, Sharpe, Beall, Fagan, Minnich & McKee

[57] ABSTRACT

A trimming apparatus for edge trimming books including a trimmer knife assembly and a conveying apparatus for conveying the books along a path of movement into aligned relationship with the trimmer knife assembly. The conveying apparatus includes a pair of horizontally extending endless conveyor chains positioned in parallel on adjacent sides of the path of movement and including outwardly extending pusher members for engaging longitudinal edges of the books and moving them along the path of movement. A pair of vertically extending guide members are positioned laterally outwardly of the endless chains for engaging the ends of the books and moving them into proper lateral alignment with the path of movement. An endless conveyor belt is associated with the endless conveyor chains for frictionally engaging an exterior face of the books and a drive mechanism acts to simultaneously drive the conveyor chains and the endless conveyor belt in the same direction with said conveyor belt being driven at a velocity slightly less than the velocity at which the conveyor chains are driven to thereby produce a frictional force acting to continuously impel the books toward the pusher members to maintain them properly oriented relative to the path. The specification also discloses an access door support for the apparatus so that the door can be slid horizontally to a partially open position and thereafter swing to a full open position.

12 Claims, 9 Drawing Sheets

BOOK FEEDING AND TRIMMING APPARATUS

BACKGROUND OF THE INVENTION

The subject invention is directed to an apparatus for trimming book and magazines to final size after they leave the stitching or stapling station of a signature gathering apparatus.

One of the final steps in the manufacture of books and magazines is edge trimming of the collated and assembled signatures or books after they have been stapled or stitched together. As can be appreciated, this trimming must be carried out with relatively great precision or the overall appearance and usefulness of the resulting magazine or book product is destroyed.

In an attempt to provide the necessary precision, a variety of types of conveying, positioning and aligning structures have been proposed for conveying the product to the trimming station and presenting it properly to the trimming knives. Often, however, these prior art structures have been unduly complex, difficult to adjust, as well as being prone to needing frequent adjustment. Moreover, they have sometimes been limited in their ability to handle a variety of product sizes.

Accordingly, there is a need for a feeding and trimming apparatus which is simpler in design and which can overcome the above-mentioned problems of the prior art.

BRIEF STATEMENT OF THE INVENTION

According to one aspect of the invention, a trimming apparatus for edge trimming assembled books or signatures includes a conveying apparatus for conveying the assembled signatures along a path in aligned relationship to the trimming knives. The conveying apparatus includes a pair of horizontally extending endless chains which are positioned in parallel on adjacent sides of the path of movement and are simultaneously driven in a first direction at a velocity "v". The chains include outwardly extending pusher members for engaging longitudinal edges of the assembled signatures and moving them along the path. Vertically extending stationary guide members are positioned laterally outwardly of the endless chains for engaging the ends of the assembled signatures and moving them laterally on the endless chains into proper lateral alignment with the path. The apparatus further includes an endless belt positioned centrally between the endless chains and aligned therewith for engaging and frictionally gripping an outer face of the books being conveyed by the endless chains. The endless belt is simultaneously driven in the same direction as the endless chains at a velocity which is only slightly less than "v" to produce a force acting to continuously impel the books toward the pusher members to maintain engagement therewith.

Because the belt constantly applies a frictional force to maintain the books in engagement with the pushers, the location of the signatures relative to the pushers is closely controlled. This assures proper orientation of the books relative to the path of movement and the edge trimming station.

In accordance with a further aspect of the invention, the endless chains deliver the assembled signatures to a trimming station including stop members which are moved into and out of stop position in timed relationship with the movement of the chains. Additionally, a pusher member is operated in timed relationship with the conveyor chains and is located to act against the trailing edge of the book at the trimming station to move it into engagement with the stop member.

In accordance with another aspect of the invention, a trimming apparatus for edge trimming assembled signatures or books includes a main housing having a generally horizontally extending, upwardly facing opening for providing access to the interior of the housing. A door is mounted on the housing for closing the opening. The assembly for supporting the door and guiding its movement comprises at least a pair of support arms each having a lower end pivoted beneath the opening and extending upwardly into pivotal engagement with the door adjacent a first end thereof. A second end of the door spaced laterally from the first end is supported from the housing in a manner for permitting horizontal movement from a closed position to a partially open position. Stop means are provided for engaging the support arms and preventing further horizontal movement of the door beyond a predetermined partially open position. However, the pivotal connection between the upper ends of the support arms allows the door to swing from the partially open to a full open position.

In accordance with a further and more limited aspect of the invention, a latch lever is associated with the door and the support arms for automatically latching when the door is swung to its full open position.

The described mounting arrangement for the door of the access opening allows the door to function as a simple and easily moved sliding door when only limited access is required. However, full opening is achieved in the manner of a simple hinged door without the objectionable extended guides, etc. which would be required for a full sliding opening.

Accordingly, the primary object of the invention is the provision of a system for feeding assembled signatures or books to a trimmer station in a manner which assures that the books are properly oriented and maintained in firm engagement with the conveyor and the positioning stops.

A further object of the invention is the provision of a conveyor system of the type described wherein the conveyor includes means which maintain forces continually acting on the books to assure that they are always properly engaged with the pushing and locating mechanisms.

A still further object is the provision of an apparatus of the type described wherein the conveying apparatus include a pair of chain type conveyors associated with a frictional belt and driven in a manner which allows the frictional belt to continually impel the assembled signatures or books into engagement with the pusher members of the chain conveyors.

A still further object is the provision of a door mounting assembly for a book trimming apparatus which allows the door to be moved horizontally with a simple sliding motion for limited access to the trimmer housing and thereafter swung to a full open position if access to the entire chamber is required.

Yet another object is the provision of an apparatus of the type described which is highly reliable in operation and relatively simple in construction and design.

DETAILED DESCRIPTION OF THE PREFERRED EMBODIMENTS

Figure 1:
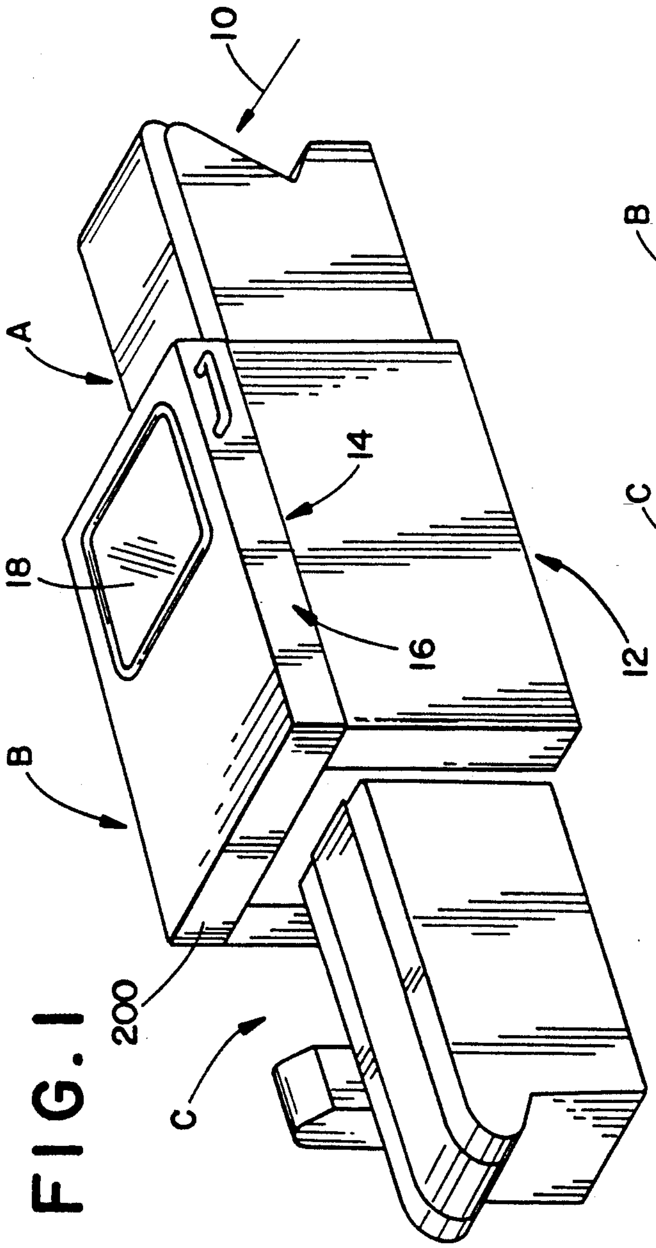
FIG. 1 is a pictorial view of the overall arrangement of the infeed table housing and the associated trimmer housing with its delivery table.
Figure 2:
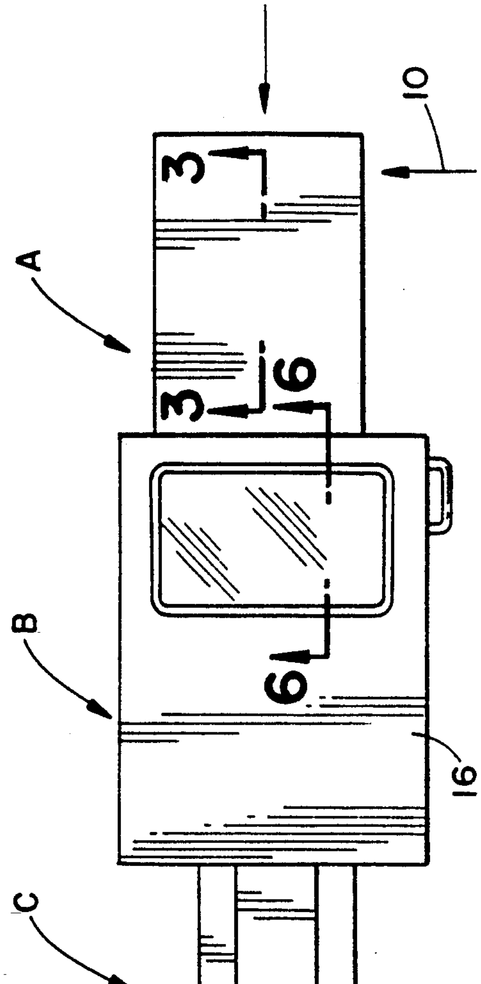
FIG. 2 is a diagrammatic plan view of the apparatus shown in FIG. 1.

Referring more particularly to the drawings wherein the showings are the purpose of illustrating a preferred embodiment of the invention only, and not for the purpose of limiting same, FIGS. 1 and 2 show the overall and somewhat diagrammatic arrangement of a preferred apparatus incorporating the subject invention. Broadly, as shown, the apparatus generally includes an infeed table assembly A which is usually associated with a signature collating assembly and a stitcher (not shown) which forms the assembled signatures or books and conveys them to the intake end of the infeed table assembly in the direction of arrow 10. The infeed table assembly A receives the assembled and stapled or stitched books and conveys them in seriatim order properly spaced and oriented to the trimmer assembly B. The trimmer assembly acts to trim the books to their final desired size. Thereafter, the trimmed and completed books are conveyed from the trimmer assembly to a delivery table C. It should be noted that the trimmer assembly B is provided with a main housing 12 having an upwardly open upper end 14 provided with a cover assembly 16 which is arranged so as to allow access to the interior of the trimmer for adjustment, maintenance, and repair. The cover assembly 16 will subsequently be described in some detail but for the present it should be noted that it includes an upwardly facing window 18 to allow visual checking of the trimming mechanism carried therein.

Of particular importance to the subject invention is the overall arrangement and functioning of the infeed conveyor system 20 carried by the infeed table assembly A. More particularly, as best shown in FIGS. 3, 3A, 3B, and 4, the infeed conveyor system generally comprises a first pair of endless flexible belt members 22 trained about two spaced sets suitable pulleys 24*a*, 24*b*, and 24*c* laid out in the relationship best shown in FIG. 3. The two belts 22 are trained about the pulleys in relatively closely spaced side-by-side relationship as shown in FIG. 3B. For the purposes of explanation and discussion, the two belts are located above and on opposite sides of a path of intended movement of the assembled signatures or book and together with a suitable pair of drum or disk members 26 act to convey the signatures from a delivery conveyor 28 generally associated with a collating and stitching line (not shown in the subject drawings) but arranged to deliver the books 30 along the line of arrow 10 in FIG. 2.

Figure 3A:
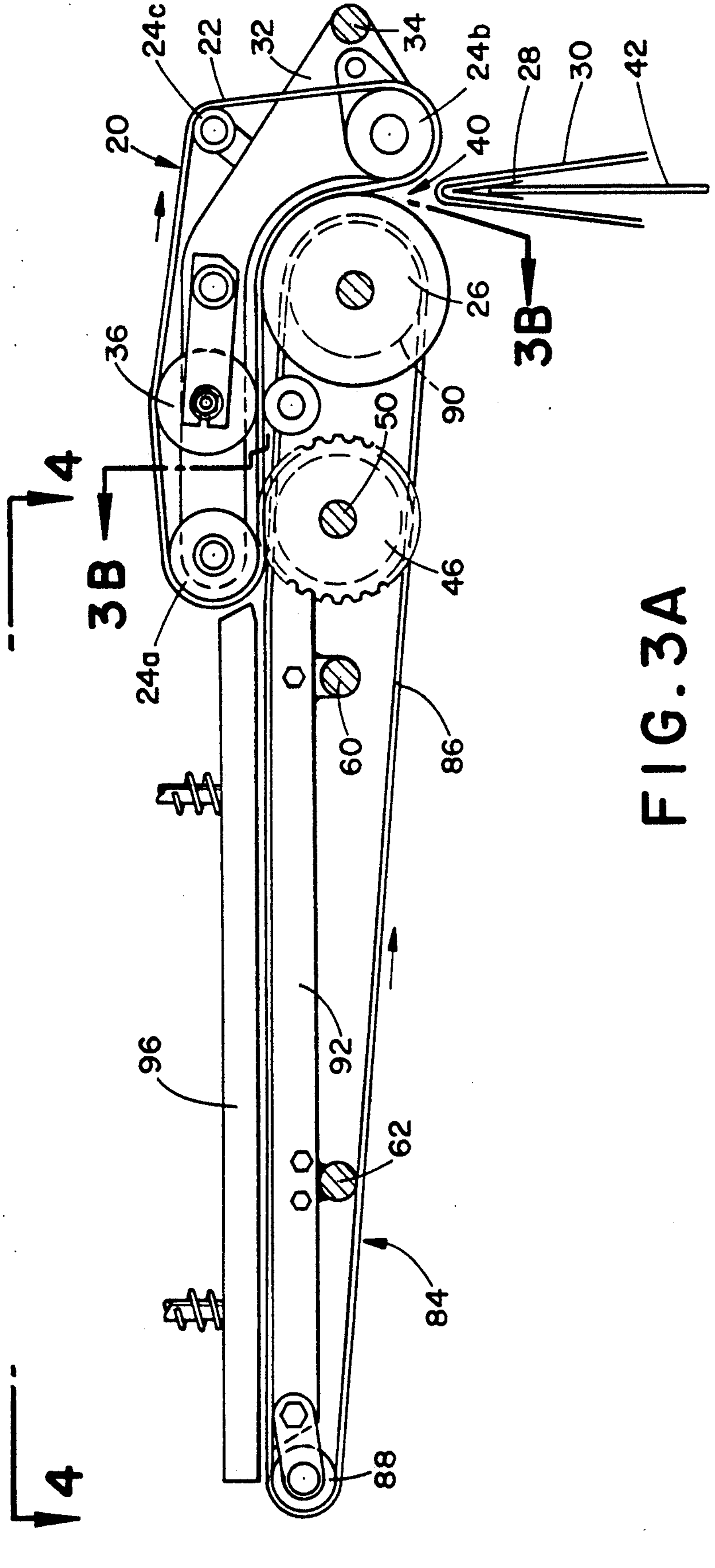
FIG. 3A is a view similar to FIG. 3 but showing the structural features in more detail and with the chain drive removed to show the central endless belt.
Figure 3B:
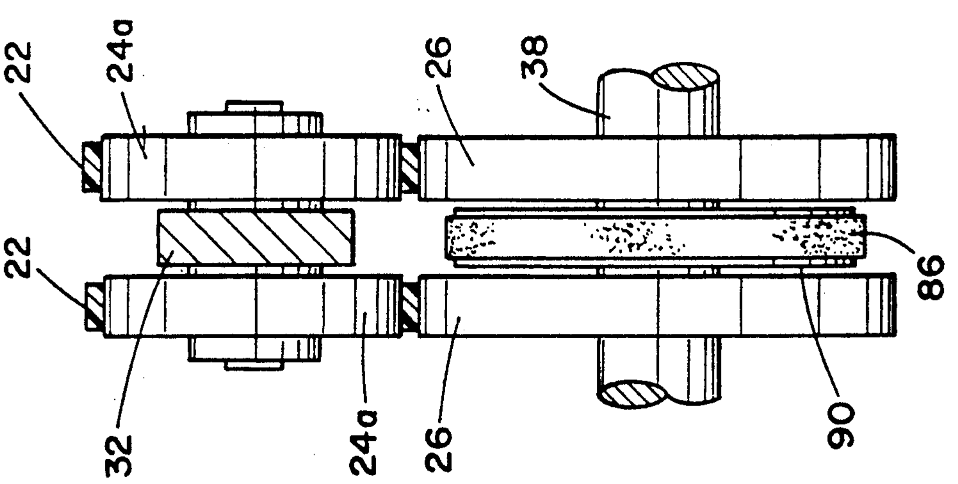
FIG. 3B is a cross-sectional view taken on line 3B—3B of FIG. 3.

As best shown in FIG. 3A, the pulleys 24*a*, 24*b*, and 24*c* are carried on a main rigid central frame 32 which is carried on a transversely extending horizontal shaft 34 pivotally supported from the side frame members (not shown) of the infeed table assembly A. Also associated with the pulleys 24*a*, 24*b*, and 24*c* is an adjustably mounted tensioning pulley 36. As can be seen from FIG. 3B, the belts 22 are in close engagement and are trained over the disk members 26. Additionally, it should be noted that the disk members 26 are carried on a horizontally extending shaft 38 which is driven at a predetermined speed and imparts movement to the belts 22.

Figure 3:
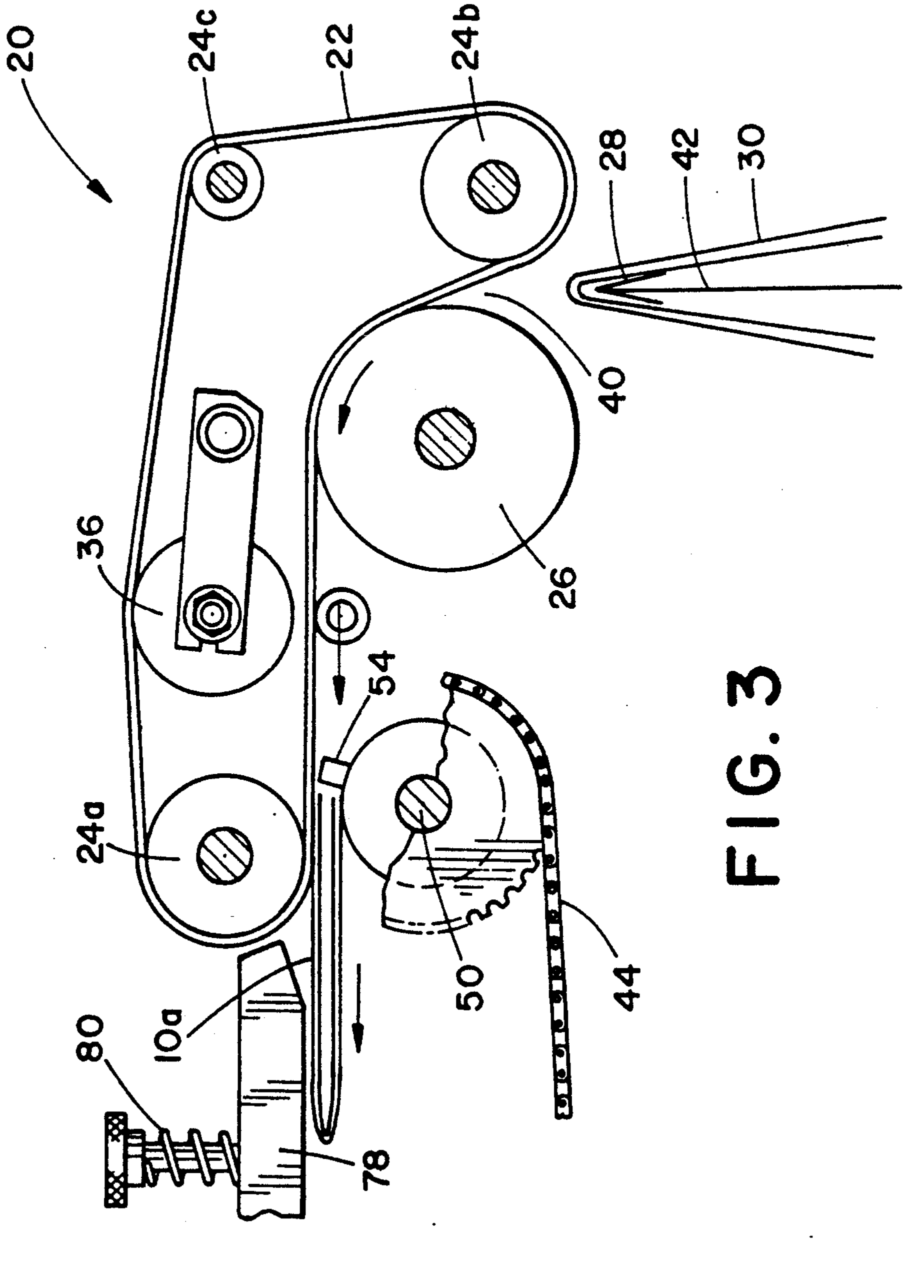
FIG. 3 is a diagrammatic side elevational view of the infeed conveyor system (the view is taken on line 3—3 of FIG. 2)

Referring more particularly to the elevational views of FIGS. 3 and 3A, the books 30 are shown being delivered to a point beneath the bite 40 generated between the feed wheel 26 and the associated lower run of the belts 22. At this point, a suitable lift mechanism 42 pushes the assembled book up into the bite area between the lower belt run and the feed wheel 26. This causes the book to be gripped along its back or spine edge and moved to a position shown and identified as 10*a* in FIG. 3.

At the illustrated position 10*a*, the conveyor system further includes a pair of continuous conveyor chain members 44 mounted on laterally opposite sides of the intended path of book movement. The conveyor chains 44 are suitably trained about pairs of sprockets 46, 48. Sprockets 46 are carried from a horizontal driven shaft 50 mounted on side frames not shown. Sprockets 48 are carried from a pair of suitable space frame assemblies 52 and 52*a* (see FIG. 4) which will subsequently be described in more detail. For present purposes it is sufficient to note that the frame assemblies 52 and 52*a* are structural duplicates but of opposite hand.

The conveyor chains are continuously driven in the direction shown and include outwardly extending pusher members 54 spaced uniformly and continuously along the chain run. The pusher members 54 act to engage the spine or back edge of the books 30 as shown and convey them along the path of movement. The conveyor chains 42 are continuously driven at a uniform speed by a conventional drive mechanism not shown.

Figure 4:
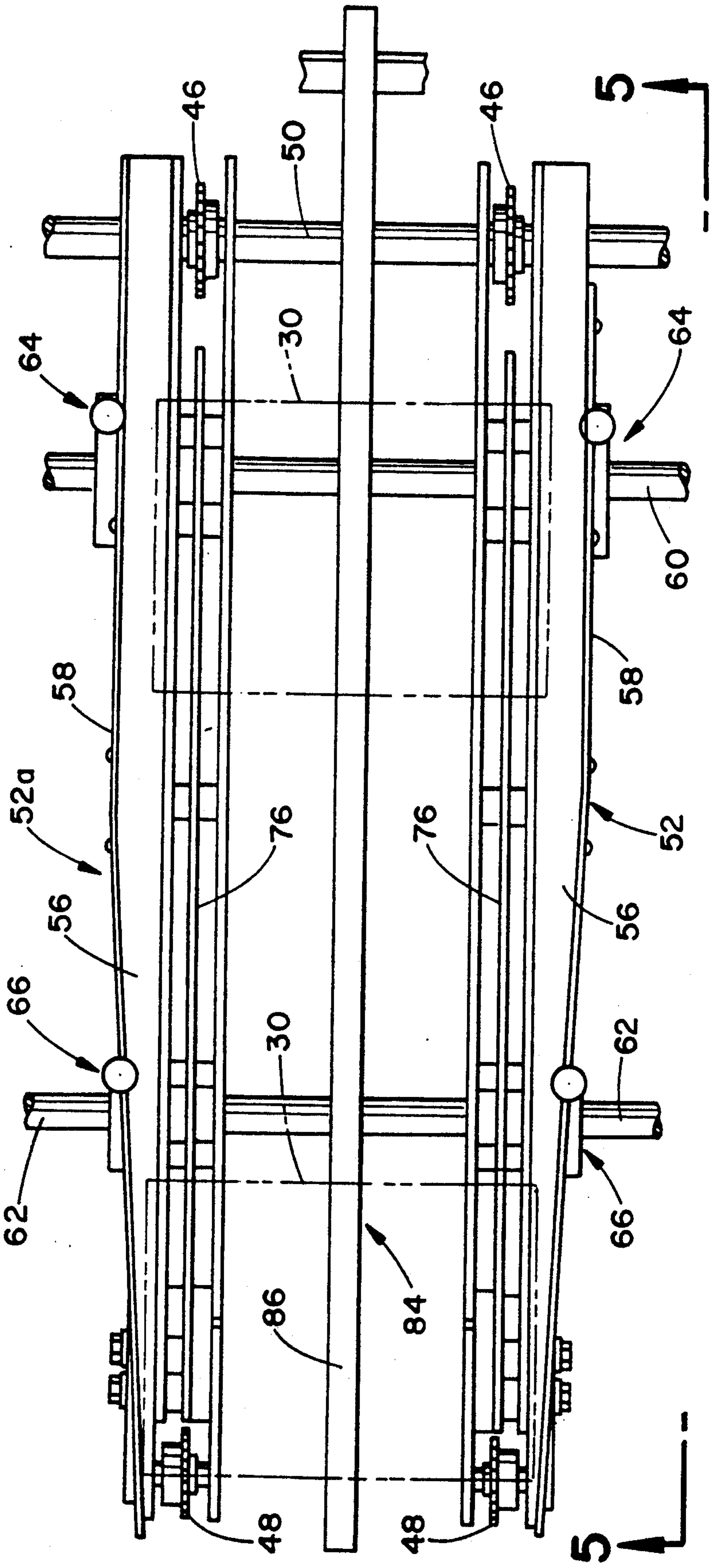
FIG. 4 is a plan view taken on line 4—4 of FIG. 3A.
Figure 5:
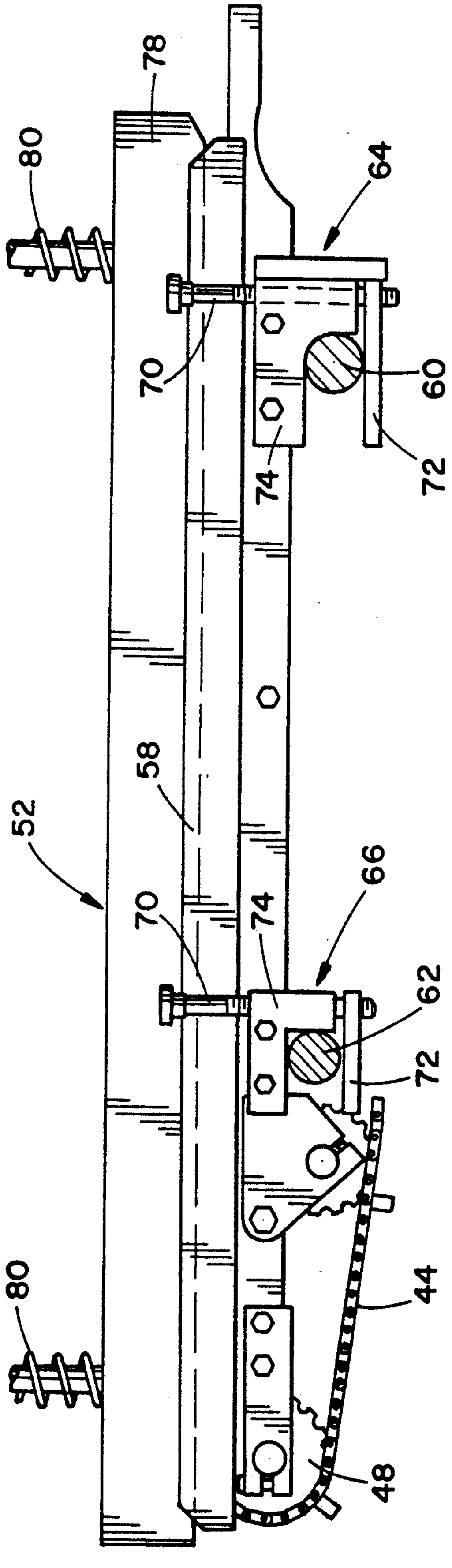
FIG. 5 is a side elevational view, somewhat diagrammatic, of the first trimming station (the view is taken generally on line 5—5 of FIG. 2)

During movement along the path, the books 30 are adjusted laterally on the conveyor chain by suitable vertical guide means best shown in FIGS. 4 and 5. As shown therein, the guide means comprise L-shaped members 56 which have suitable vertical guide sections 58 carried from the frame assemblies 52 and 52*a* as shown. The assemblies 52 and 52*a* are adjustably carried from horizontally extending support bars 60 and 62. These support bars 60 and 62 are also supported from suitable side frames on the infeed table assembly A. In the embodiment under consideration, the vertical guide means 56 and the associated conveyor chains 42 and sprocket assemblies 46, 48 are mounted for adjustment laterally of the path of movement so that they can be positioned to properly engage the ends of books passing along the path of movement to suitably center them relative to the guide chains and the first trimmer station. As shown, adjustment is accomplished through clamp bar assemblies 64, 66 carried on the bars 60, 62 respectively and supporting the associated frame 52 or 52*a* (See FIG. 5). The assemblies 64, 66 are releasably clamped to the associated bar by a handle member 70 which is threadedly engaged with a clamp plate 72 to drive the plate 72 toward and away from the main support bracket 74.

As can best be seen in FIG. 4, each of the conveyor chains is associated with a horizontal guide or support plate 76 which assist in supporting the books during their travel along the path. Additionally, each of the support members 76 is associated with a superposed guide bar member 78 (See FIGS. 3B and 5) which is supported from brackets carried on transversely extending bars (not shown) located over the conveyor chains as shown. These bars are maintained under a suitable clamping pressure by compression springs 80 which act to force the guide bars downwardly toward the subjacent guide plates.

Of particular importance to the subject invention is the arrangement which assures proper positioning of the books 30 being conveyed on the chain conveyors. In this regard, means are provided to continually apply a force to the books acting to impel them rearwardly to the right as viewed in FIGS. 3 and 3A) against the pushers and assure that they are properly engaged with the pushers 54 on each chain in a position extending exactly transverse or perpendicular to the path of movement. In the subject embodiment, the means for performing this function comprise an endless belt assembly 84 (See FIGS. 3A and 4) which is positioned centrally between the two endless chain conveyors and extending longitudinally of the path of movement. The assembly comprises a belt 86 which is resilient and has a suitable frictional surface for engagement with the lower face of the assembled books 30 being conveyed by the chain conveyor. More particularly, the belt 86 is trained over suitable pulleys 88 and 90. Pulley 90 is carried from transversely extending shafts 38 which are rotatably mounted in the side frames of the infeed table and is located between the drums 26 as best seen in FIG. 3B. The pulley 88 is carried from the left end of a rigid bar 92 supported from shafts 60, 62 (See FIG. 3A). It should also be noted that the upper surface of bar 92 engages the underside of the upper run of belt 86 to support it during its travel. A suitable superjacent guide or pressure bar 96 is associated with the belt and is in alignment therewith as shown in FIG. 3. This guide bar 96 is carried from suitable brackets not shown and is maintained under a slight bias toward the belt 92 by springs 98 so as to cause the books passing thereunder to be properly engaged with the belt. According to the invention, the belt is driven in the same direction as the conveyor chains but at a speed only a slight percentage less then the speed of the conveyor belts. For most operations it has been found that a speed differential of approximately 3% is sufficient. That is, the speed of the belt is approximately 3% less than the speed of the conveyor chains. The speed control and drive mechanisms are not shown but could be of any conventional well known type. For example, simply using different size gears for driving the shafts 48 and 38 could provide the necessary speed differential.

Because of the relationship between the central belt and the conveyor chains, each book 30 being conveyed along the path is continuously impelled with a slight frictional force toward the pusher members 54. As a consequence, the books are always in proper engagement with the pushers and are maintained in proper alignment relative to the path of movement and the first trimming station which will subsequently be described. It is, of course, understood that by varying the speed of the belt or the force with which the guide bar acts against the belt, it is possible to generate different forces or to compensate for differing frictional coefficients present on differing book covers.

Figure 6:
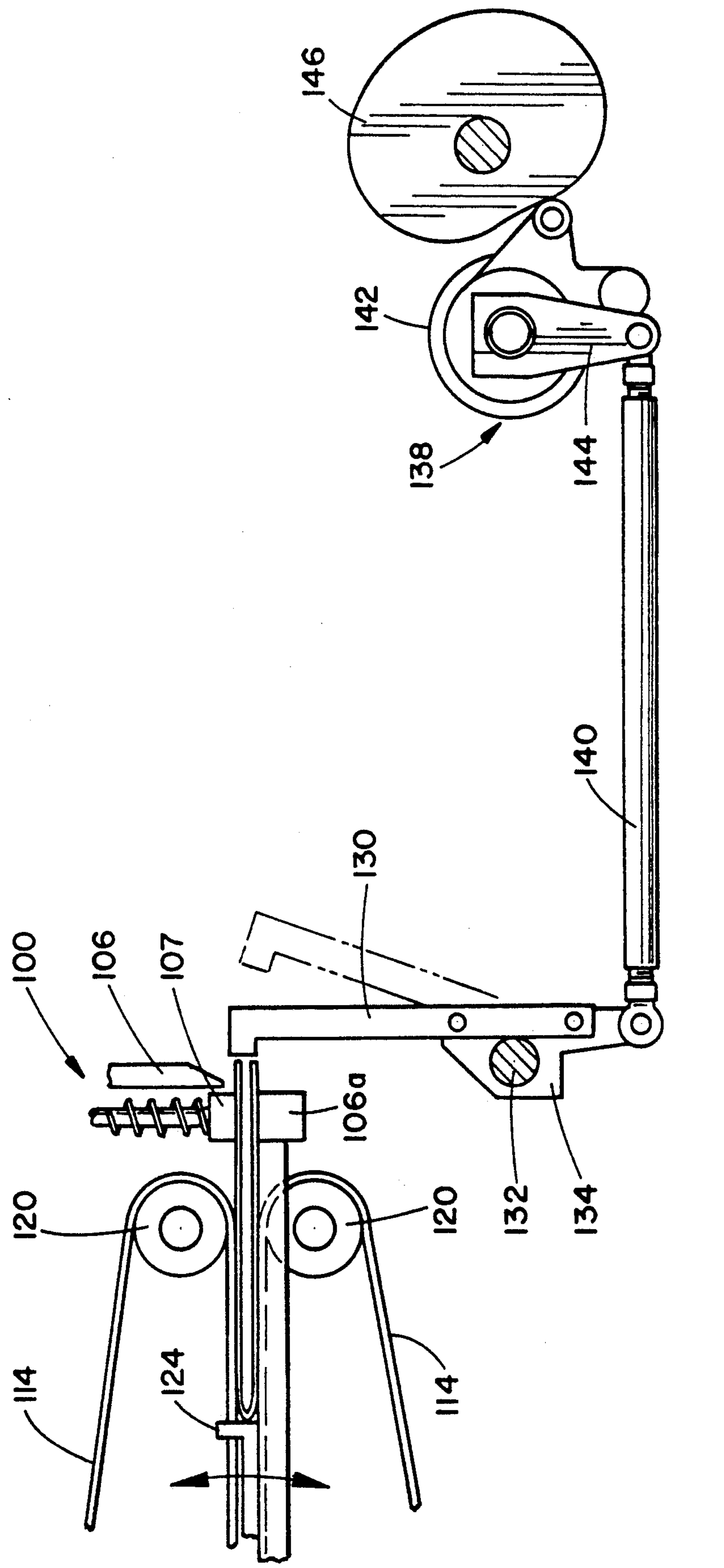
FIG. 6 is a cross-sectional view taken on line 6—6 of FIG. 2.
Figure 7:
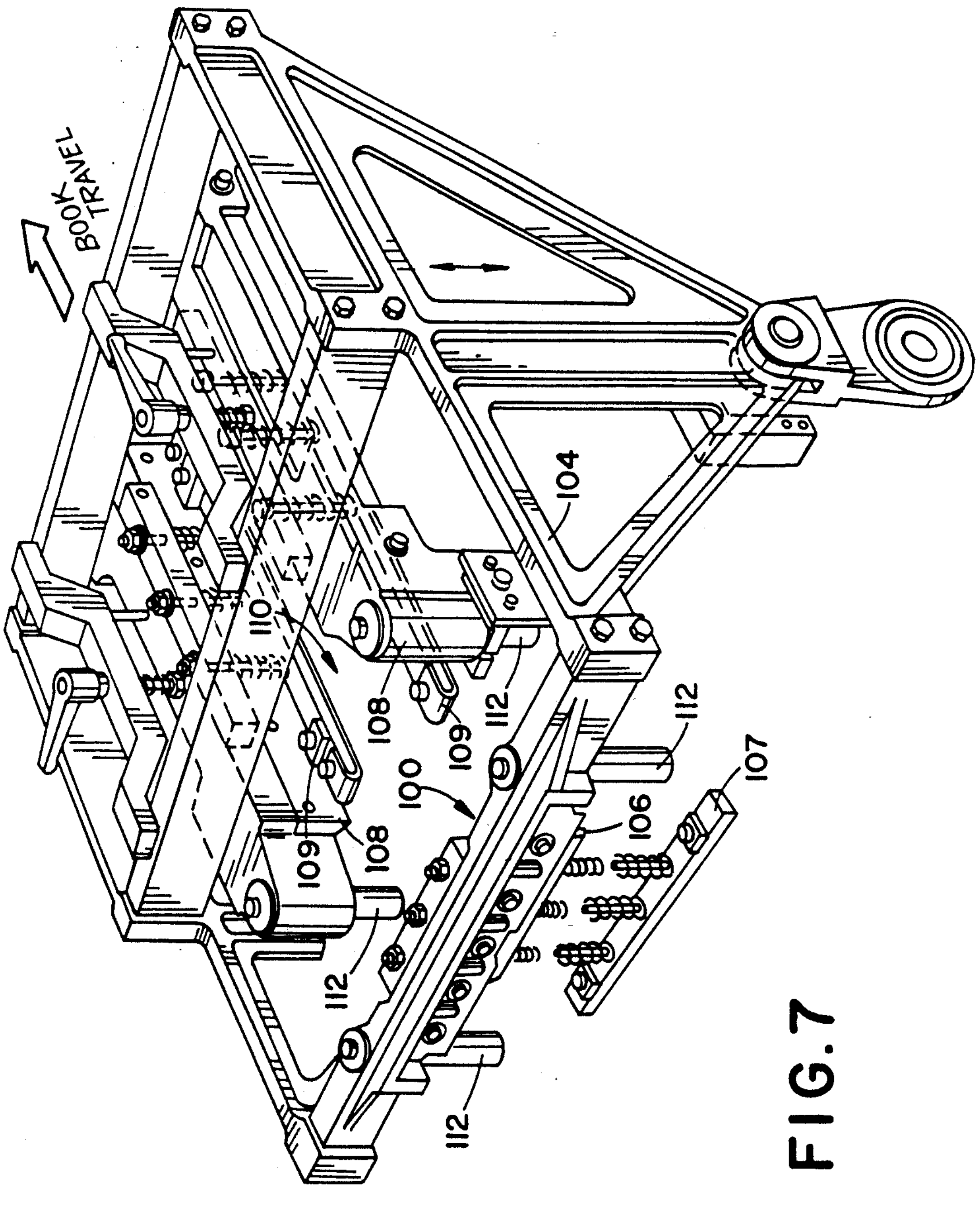
FIG. 7 is a pictorial view, somewhat diagrammatic, of the trimming mechanism.

As the individual booklets leave the left hand end of the infeed conveyor system shown in FIG. 3, they are impelled into the first trimming station 100 of the trimmer assembly B. Broadly, referring to FIGS. 6 and 7, the trimming apparatus functions to first trim the vertical edge opposite the spine and, thereafter, in second trimming station 102 to simultaneously trim the ends thereof. In general, the specific arrangement of the various components of the trimming assembly B are relatively conventional and include a main frame 104 which carries in suitable fashion a first blade 106 and a second pair of cooperating blades 108 which define the second trimming station 110. The knives or blades 106 and 108 are associated with suitable bed knives 106*a* and 108*a*, respectively. Conventional spring biased clamp bars 107 and 109 move with the blades and clamp the book to the bed knives prior to engagement by the blades 106 and 108. The main frame 104 is reciprocated vertically by a suitable drive assembly (not shown) and is carried on vertical extending slide posts 11 located generally as shown in FIG. 7. Running centrally of the trimmer station and in alignment with the previously mentioned path of movement, is a pair of opposed positive drive belts 114 which engage opposite faces of the books and convey them from the first trimming station 100 to the second trimming station 110. The belts 114 are positive drive and are suitably trained about the pulleys 120 carried on main horizontally extending shafts. In the preferred embodiment, the belts 114 are driven intermittently in timed relationship with the vertical cutting movement of the trimmer knives or blades 106, 108.

Of importance to the invention is the arrangement for locating the books at the first trim station 100. Specifically, as will be recalled, the books are presented at the first trimming station by being discharged from the conveyors to the position shown in FIG. 6. At this position, a spaced pair of suitable stop members 124 are oscillated upwardly in timed relationship with the movement of the knives 106 and 108. The members 124 are in position to engage the spine of the book and stop its forward movement into the indexed belt drives. While in this position, means are provided to apply a tapping force to the rear or scrap edge of the book to properly locate it in engagement with the stop members. This tapping movement is shown in FIG. 6 and comprises a first vertically extending tapping member 130 mounted for oscillation as shown on a horizontally extending shaft 132. A suitable bracket 134 and bearings allow oscillation between a retracted position shown in phantom and a tapping position shown in solid lines. Movement of the tapping assembly is achieved through an adjustable drive assembly 138 connected with the lower end of the tapping arm through connecting link 140. The drive assembly allows adjustment of the position of the tapping arm by simple releasing of a manual clutch 142 from the crank assembly 144 and manually moving the tap arm into the proper adjusted relationship with a particular book positioned at the trimming station as shown. With the clutch reengaged and properly oriented relative to the drive cam 146, the desired movements take place. The cam is, of course, rotated in timed relationship with the indexing of the belts 114 and the movement of the stop members 124. After the book has been properly located at the first trimming station, the trimming takes place. Thereafter, the stops retract to a subjacent position and the belts 114 are indexed to move the book to the second trimming station 110 wherein the book is cut to a proper length and thereafter discharged from the trimming unit. The relationship of the tapping mechanism and the movable stops assures that the book is always properly located during the trimming operation.

Figure 8:
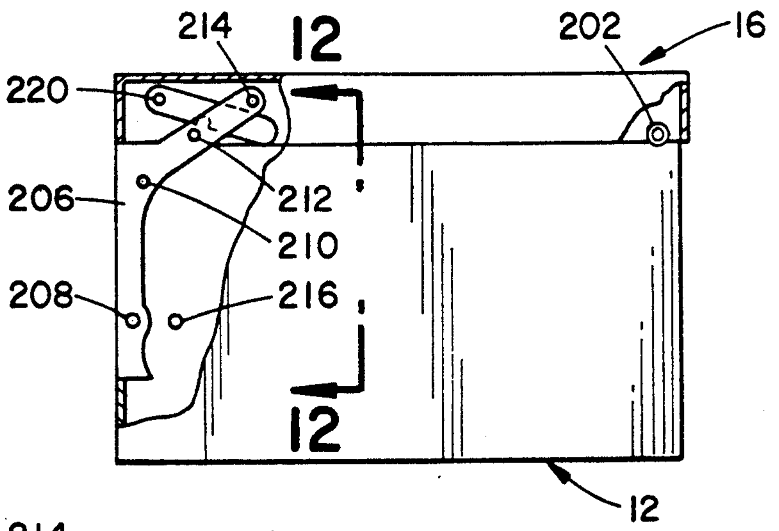
FIGS. 8, 9, and 10 are side elevational views, somewhat diagrammatic, showing the various positions of the access opening cover or door for the trimmer housing.
Figure 9:
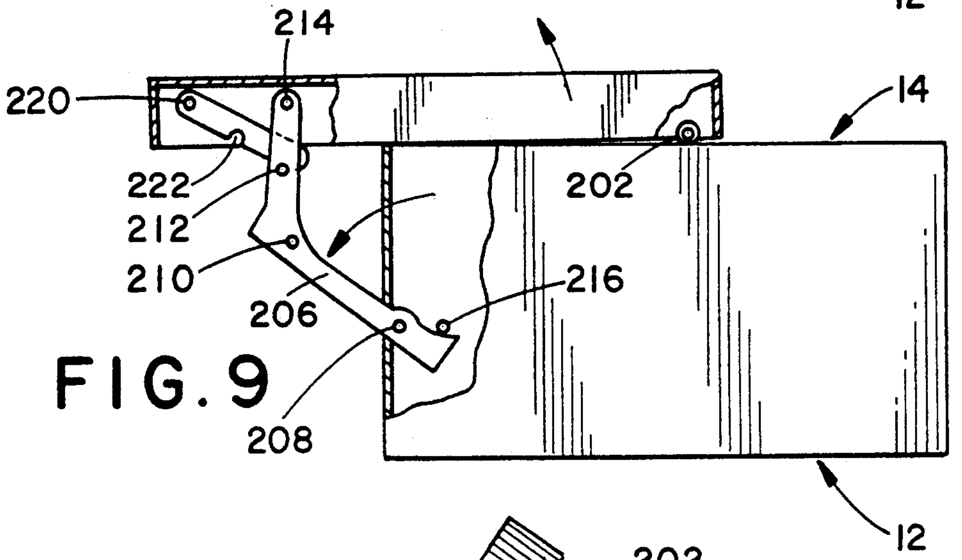
Figure 10:
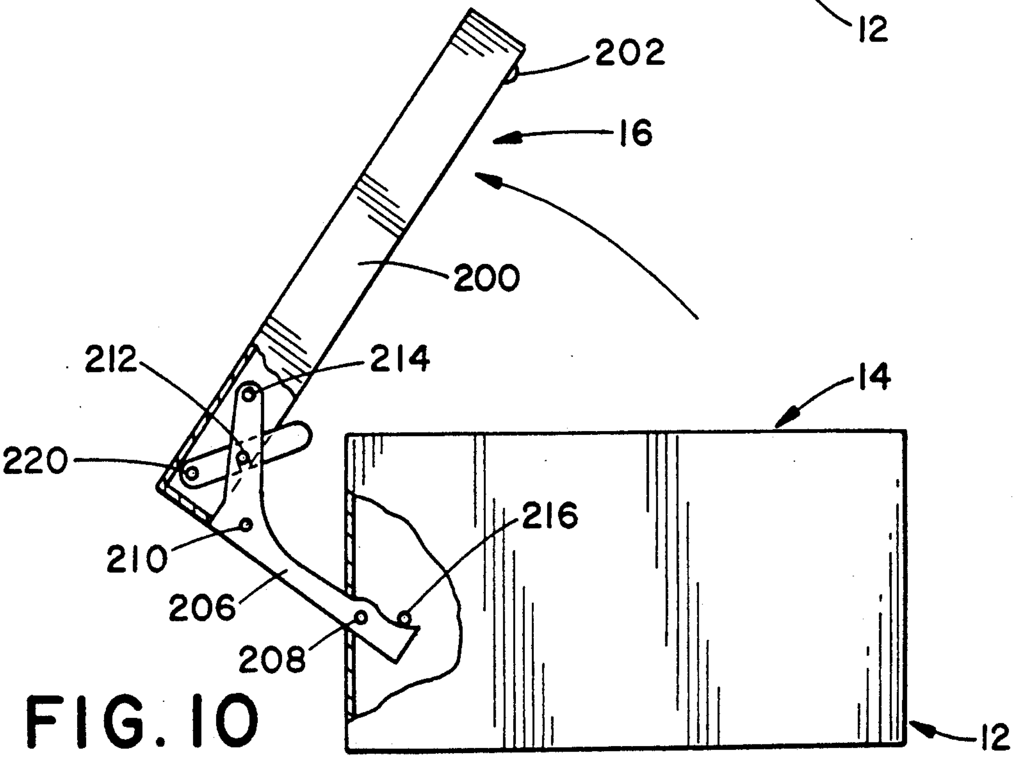

As previously discussed, access must frequently be had to the trimming knife apparatus within housing 12 for maintenance and adjustment. For this reason, the entire cover 16 must be capable of being moved to a full open position at certain times. At other times, it is necessary only that limited access to the inlet end (right hand end as viewed in FIG. 1) of the apparatus be assured. The subject device is arranged such that the cover assembly 16 (see FIGS. 8–10) can be in a full closed position as shown in FIG. 8 or moved by a simple horizontal sliding movement to a limited access opening position such as shown in FIG. 9. From the FIG. 9 position, however, it is possible to swing the cover or door assembly 16 to a full open position as illustrated in FIG. 10. Thus, it is not necessary to provide a plurality of doors or to always be required to swing the entire door assembly 16 open when access is required.

Figure 11:
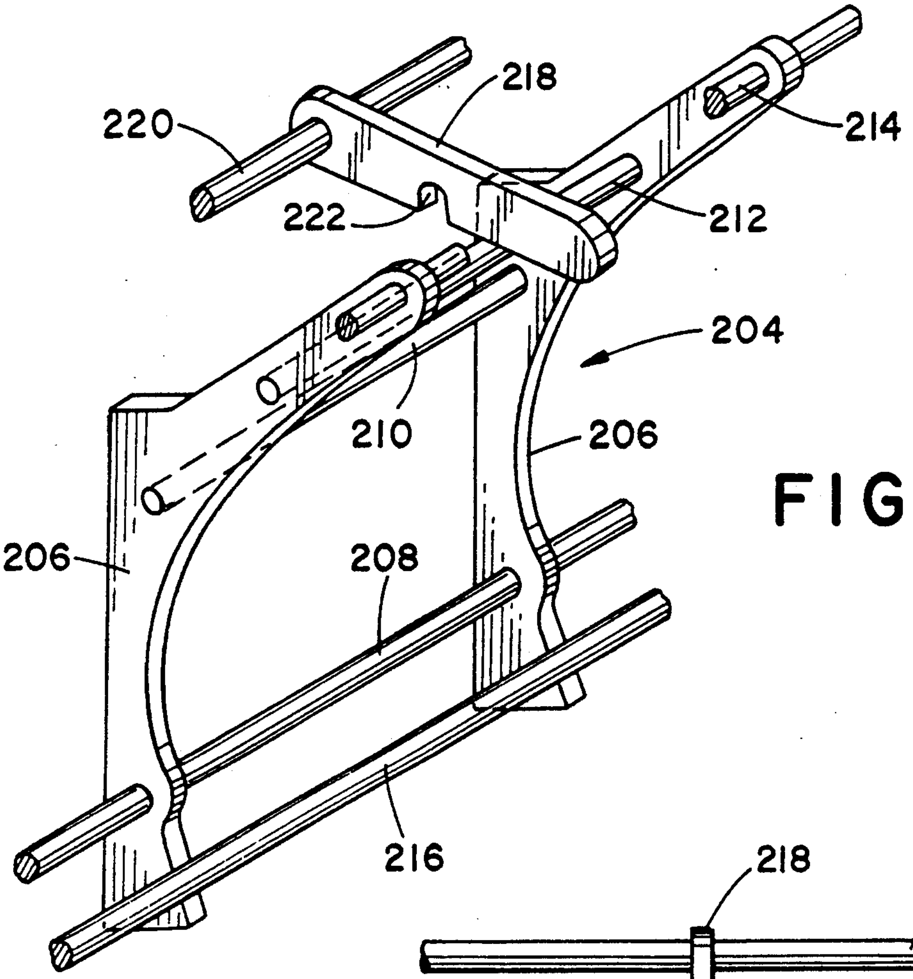
FIG. 11 is a pictorial view of the cover or door support mechanism.
Figure 12:
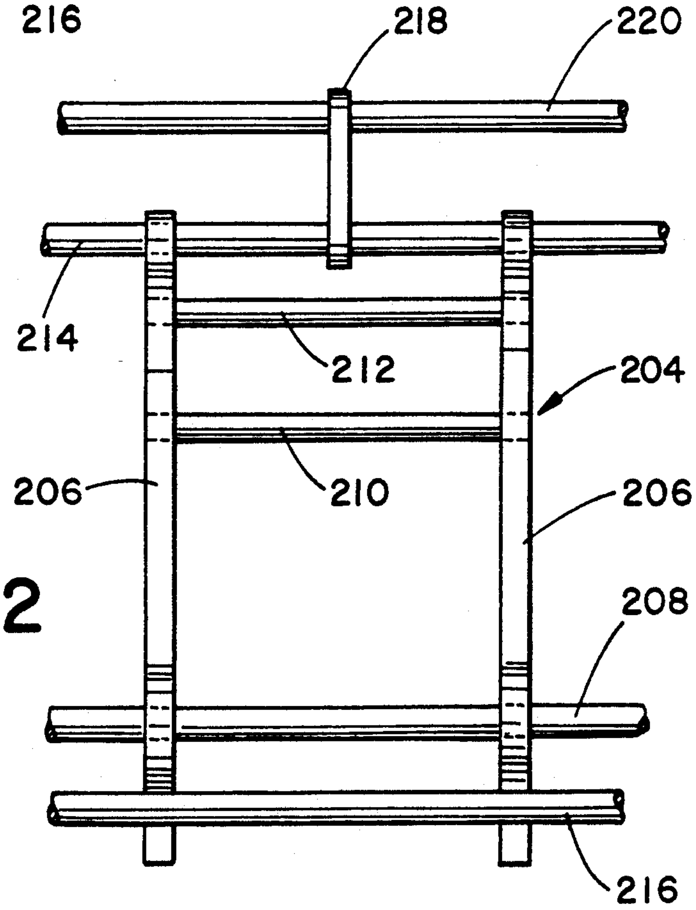
FIG. 12 is a partial cross-sectional view taken on lines 12—12 of FIG. 8.

The arrangement for mounting the door and providing the various opening arrangements as described is shown in FIGS. 8–12. As illustrated therein, the main cover or door assembly 16 is mounted at the open upper end 14 of the trimmer housing 12 and has a downwardly extending peripheral side wall 200. As mentioned earlier, a suitable viewing window 18 is also provided in the top surface of the door. The right hand end of the door as viewed in FIG. 8 is supported from the top surface of the side walls of the trimmer housing 12. Suitable wheels or rollers 202 are preferably provided on the right hand end and ride on the top surfaces of the walls or, in the alternative, suitable guide tracks or rails provided to support these wheels. The left hand end of the door 16 is suitably supported and guided in its movement by a support mechanism 204 which is pivotally mounted and supported while also being pivotally connected to the door 16. This mechanism allows the door 16 to have a limited horizontal movement as depicted in FIG. 9 while also being capable of being pivoted or swung open about the upper ends of the mechanism as seen in FIG. 10. More particularly, as seen in FIGS. 11 and 12, the mechanism 204 includes a pair of vertically extending L-shaped lever arms 206 which are pivotally mounted adjacent their lower end on a horizontally extending shaft 208 carried between the side walls of the main trimmer housing or frame 12. Additional suitable bars or cross members 210 and 212 are joined between the L-shaped members 206 as shown. At their upper ends, a horizontally extending shaft 214 extends between the front and rear sides 200 of the door as shown and is pivoted to the upper ends of the L-shaped members. This allows the door to have the arcuate swinging motion depicted in FIGS. 9 and 10. A suitable stop member in the form of a shaft 216 is extended between the sides of the trimmer frame and engages the L-shaped member as shown to limit the pivoting movement to the position shown in FIG. 10. As the cover is swung counterclockwise as viewed in FIGS. 9 and 11, a suitable latch bar 218 carried pivotally on a horizontal shaft 220 moves to a position for engagement with the cross member 212 as shown. A slot or recess 222 is formed on the underside of latch bar 218. As the door reaches a desired limit of pivoting relative to the mechanism 204, the recess engages cross member 212. This latches the door in the raised position and holds it therein until the latch bar is lifted allowing the door to swing to the position shown in FIG. 9. From the FIG. 9 position, the door can be simply moved or slid to the right to its final closed position as shown in FIG. 8.

As can be appreciated, this mechanism allows the desired door movements to be achieve simply and with a minimum of complexity.

The invention has been described in great detail in conjunction with a preferred embodiment sufficient to allow one of ordinary skill to make and use the same. Obviously modifications and alterations of the preferred embodiment will occur to others upon a reading and understanding of this specification. It is intended to include such modifications as part of the invention insofar as they come within the scope of the claims.

It is now claimed:

1. A trimming apparatus for edge trimming assembled signatures or books comprising:

a housing;

a trimmer knife assembly mounted in said housing for edge trimming assembled signatures or books conveyed thereto;

a conveying apparatus for conveying assembled signatures or books along a path of movement into aligned relationship with the trimmer knife assembly, said conveying apparatus including a pair of horizontally extending endless conveyor chains positioned in parallel on adjacent sides of the path of movement and including outwardly extending pusher members for engaging longitudinal edges of the assembled signatures or books and driving them forwardly along the path of movement so that the forwardly driven assembled signatures or books are moved solely by said conveyor chains, a pair of vertically extending guide members positioned laterally outwardly of the endless chains for engaging the ends of the assembled signatures and moving them into proper lateral alignment with the path of movement, an endless conveyor belt is associated with the endless conveyor chains for frictionally engaging an exterior face of said assembled signatures or books; and, drive means for simultaneously driving said conveyor chains and said endless conveyor belt in the same direction with said conveyor belt being driven at a velocity slightly less than the velocity at which said conveyor chains are driven to thereby produce a frictional force acting to continuously impel said assembled signatures or books rearwardly of the direction of movement and toward said pusher members to maintain said assembled signatures or books properly oriented relative to said path and in engagement with said pusher members.

2. A trimming apparatus as defined in claim 1 including means for permitting said vertically extending guide members to be adjusted laterally relative to said path.

3. A trimming apparatus as defined in claim 1 wherein said endless belt is positioned centrally between the endless conveyor chains.

4. A trimming apparatus as defined in claim 1 wherein said endless belt is positioned under said path of movement with an upper run of said endless belt positioned to engage a lower face of assembled signatures or books conveyed along said path of movement.

5. A trimming apparatus as defined in claim 1 including locating members associated with said trimmer knife assembly for engaging the assembled signatures or books conveyed to said trimmer knife assembly by said conveying apparatus, and a tamper member operated in timed relationship with said trimmer knife assembly for moving and holding said assembled signatures in engagement with said locating members.

6. A trimming apparatus as defined in claim 5 including means by which said locating members are pivoted into and out of locating position in timed relationship with movement of said trimmer knife assembly.

7. A trimming apparatus as defined in claim 1 wherein each of said endless conveyor chains is carried on a separate support frame mounted for adjustment laterally of said path.

8. A trimming apparatus as defined in claim 7 wherein said vertically extending guide members are each associated with a separate one of said conveyor chains and are carried on the same support frame as the conveyor chain with which it is associated.

9. A trimming apparatus as defined in claim 1 including a presser bar member located over said endless belt for applying a downwardly directed force against the upper face of assembled signatures or books being conveyed along said path of movement.

10. A trimming apparatus as defined in claim 1 including means associated with said vertically extending guide members for supporting the assembled signatures or books as they are conveyed along said path of movement.

11. A trimming apparatus for edge trimming assembled signatures or books comprising:

a housing;

a trimmer knife assembly mounted in said housing for edge trimming assembled signatures or books conveyed thereto;

a conveying apparatus for conveying assembled signatures or books along a path of movement into aligned relationship with the trimmer knife assembly, said conveying apparatus including a pair of horizontally extending endless conveyor chains positioned in parallel on adjacent sides of the path of movement and including outwardly extending pusher members for engaging longitudinal edges of the assembled signatures or books and moving them along the path of movement, a pair of vertically extending guide members are positioned laterally outwardly of the endless chains for engaging the ends of the assembled signatures and moving them into proper lateral alignment with the path of movement, an endless conveyor belt is associated with the endless conveyor chains for frictionally engaging an exterior face of said assembled signatures or books; drive means for simultaneously driving said conveyor chains and said endless conveyor belt in the same direction with said conveyor belt being driven at a velocity slightly less than the velocity at which said conveyor chains are driven to thereby produce a frictional force acting to continuously impel said assembled signatures or books toward said pusher members to maintain them properly oriented relative to said path; and, each of said endless conveyor chains being mounted in a separate support frame mounted for adjustment laterally of said path.

12. A trimming apparatus as defined in claim 11 wherein said vertically extending guide members are each associated with a separate one of said conveyor chains and are carried on the same support frame as the conveyor chain with which it is associated.

* * * * *